March 18, 1947.  E. FRIEDMAN  2,417,480

CONFECTION

Filed Aug. 14, 1944

INVENTOR.
Edward Friedman
BY
ATTORNEY

Patented Mar. 18, 1947

2,417,480

UNITED STATES PATENT OFFICE 2,417,480

CONFECTION

Edward Friedman, Brooklyn, N. Y.

Application August 14, 1944, Serial No. 549,395

2 Claims. (Cl. 46—179)

This invention relates to new and useful improvements in a confection.

More specifically, the invention proposes the construction of a confectionery whistle pop characterized by a candy whistle mounted on a stick made of wood or similar material.

Still further it is proposed to provide a whistle pop as aforesaid having means for varying the tone of the whistle and means for indicating the tone thereof.

A further object of the invention proposes a candy whistle pop as aforesaid having a slidable stick and means preventing loss of the candy whistle from the stick.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Figures 1, 2, 3, 4, 5:
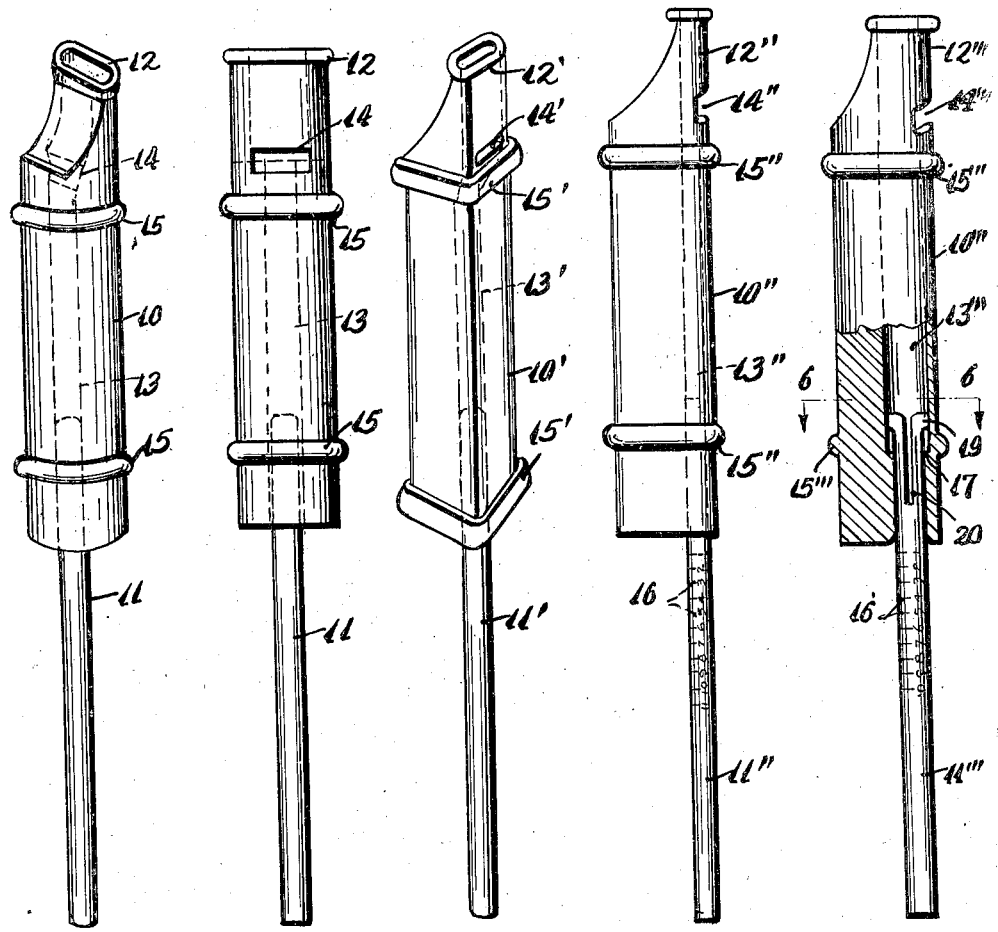
Fig. 1 is a side view of a whistle pop made in accordance with this invention.
Fig. 2 is a front view of the pop shown in Fig. 1.
Fig. 3 is a side view of a whistle pop constructed in accordance with a modification of this invention.
Fig. 4 is a side view of a whistle pop made in accordance with another modification of this invention.
Fig. 5 is a side view, partly in central vertical section, of a whistle pop made in accordance with still another modification of this invention.

The whistle pop shown in Figs. 1-2, according to this invention, includes a cylindrical candy whistle 10 and a stick 11 on which the whistle is mounted. The whistle 10 has a mouthpiece 12. An internal passage or chamber 13 extends from the mouthpiece through the other end of the whistle, the stick 11 being secured in the lower end of the chamber 13. The portion of chamber 13 between the upper end of the stick 11 and the mouthpiece forms a sounding box of the whistle. A sound-making port 14 is formed in the front of the whistle, opening into chamber 13. Two annular ribs 15 are formed on the whistle exterior surface.

If desired, a small candy ball may be disposed loosely in chamber 13 to assist in forming the sound. This ball is not shown in the drawings.

The whistle pop shown in Fig. 3 is similar to the whistle pop of Figs. 1-2 except that the whistle 10' is square in cross section instead of being round in cross section. Other parts of the whistle pop of Fig. 3 corresponding to similar parts of the whistle pop of Figs. 1-2 are designated by like references with an accent added.

The whistle pop shown in Fig. 4 is similar to the whistle shown in Figs. 1-2 but distinguishes therefrom in that the stick 11" is slidably disposed in the chamber 13" so that the tone of the whistle can be varied by moving the stick, which has enough friction in its engagement with the wall of chamber 13" to prevent the candy whistle from being lost from the stick. Graduations 16 are formed on the stick for indicating the different tones obtained from the whistle by moving the stick relative to the whistle.

Figure 6:
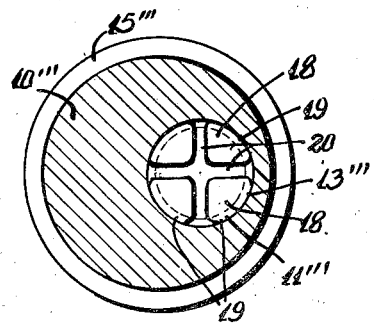
Fig. 6 is an enlarged section on the line 6—6 of Fig. 5.

The whistle pop shown in Figs. 5-6 is similar to the whistle pop shown in Fig. 4 except that the chamber 13''' is of smaller diameter at its bottom portion than thereabove providing a shoulder 17 and the stick 11" is split at its upper end to provide four parts 18, each provided with a flange 19 adapted to coact with shoulder 17 to prevent the stick from accidentally being separated from the whistle. The parts 18 are sufficiently separated by slots 20 to permit them to be squeezed together so that the outside circumference of the flanges 19 is small enough to pass through the reduced portion of the chamber 13''' permitting the stick to be assembled with the whistle. As soon as the flanges 19 pass above the reduced portion of the chamber 13''', that is above the shoulder 17, the stick can not be removed from the whistle, but may be slid relative thereto.

It is to be understood that this confectionery whistle pop may be of any desired shape, to simulate the shape of any present whistle or a candy whistle of any new type. The holding stick 11 may also be inserted in any portion of the confectionery whistle.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a whistle, an internal chamber and rod; the internal chamber being provided with an opening at the end removed from the lip end of the whistle, said opening having a smaller cross-section than the chamber; said rod extending through the opening and in a sliding fit therewith, the portion of the rod which extends into the chamber being slotted diametrically in right angular planes forming four quarter pieces adapted to be squeezed together and to spring back when released, each of said pieces having an outwardly extending flange constantly urged into contact with the wall of said internal chamber and adapted to coact with the end of the chamber about the opening to prevent disassemblage.

2. In a whistle, an internal chamber and rod; the internal chamber being provided with an opening at the end removed from the lip end of the whistle, said opening having a smaller cross section than said chamber; said rod extending through the opening and in sliding fit therewith, the portion of the rod which extends into the chamber being slotted diametrically in right angular planes forming four resilient quarter pieces adapted to be squeezed together and to spring back when released, pressing against the internal wall of said chamber, each of said pieces having an outwardly extending flange adapted to coact with the end of the chamber about the opening to prevent disassembly, and the portion of said rod which is normally situated outside said internal chamber being graduated indicating stops for various sounds.

EDWARD FRIEDMAN.

REFERENCES CITED

The following references are of record in the file of this patent:

UNITED STATES PATENTS

| Number | Name | Date |
| --- | --- | --- |
| 1,113,371 | Pajeau | Oct. 13, 1914 |
| 174,845 | Park | Mar. 14, 1876 |
| 229,163 | Mills | June 22, 1880 |
| 388,439 | Olney | Aug. 28, 1888 |
| 603,555 | Davis | May 3, 1898 |
| 1,111,513 | Woodard | Sept. 22, 1914 |
| 1,393,139 | Kiesel, Jr. | Oct. 11, 1921 |